UNITED STATES PATENT OFFICE.

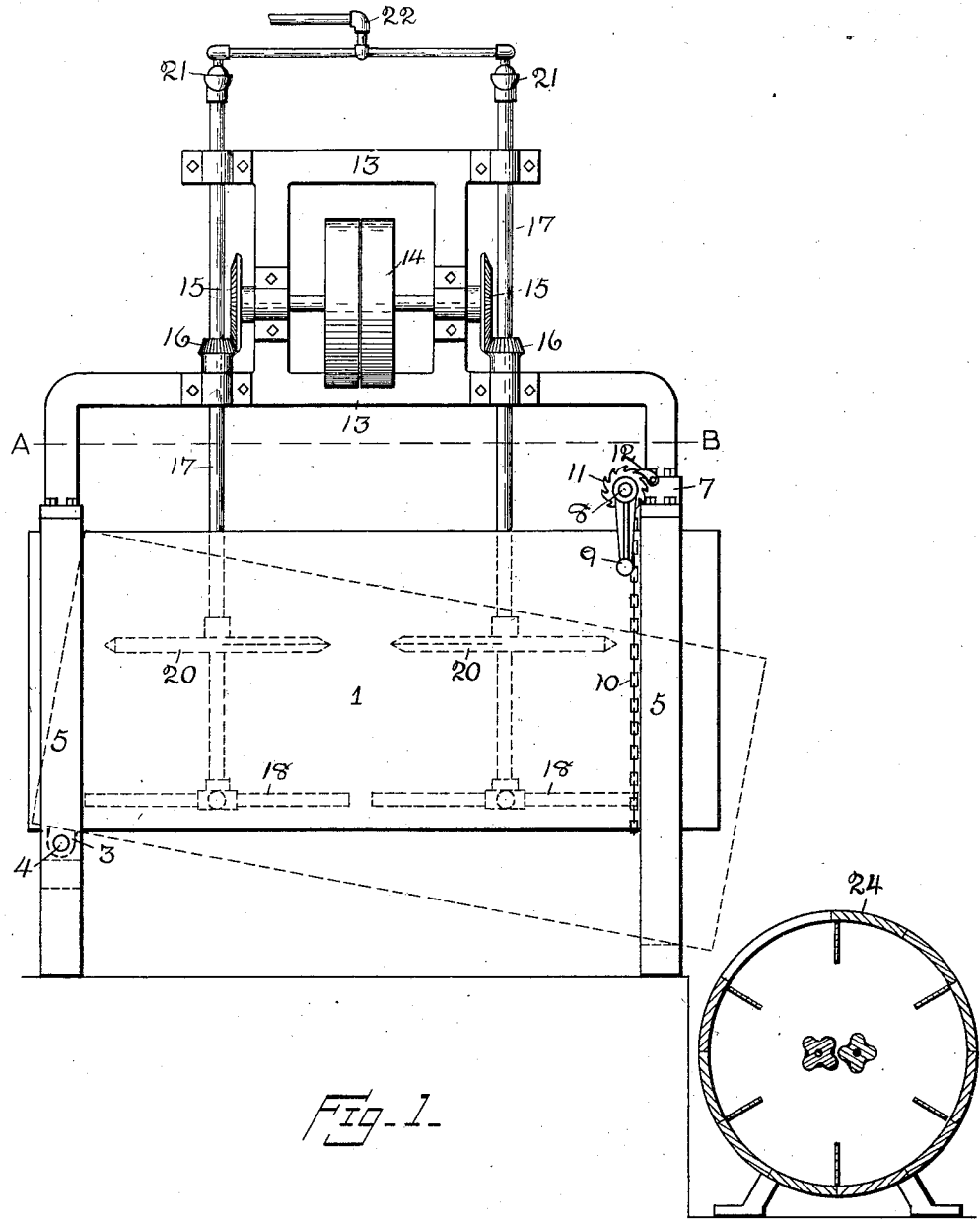

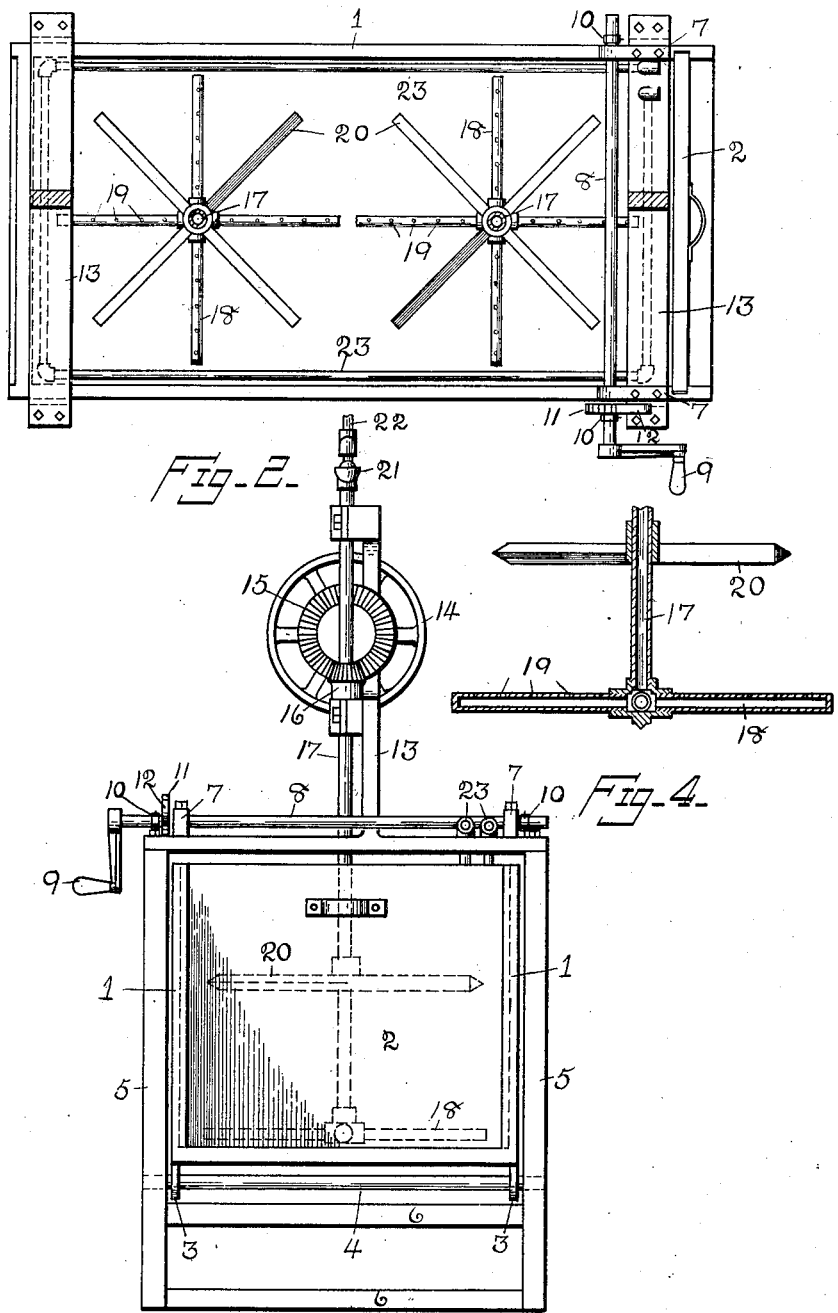

FERDINAND SEIM, OF LOUISVILLE, KENTUCKY.

PROCESS OF GRANULATING AND PURIFYING BUTTER.

No. 898,070.  Specification of Letters Patent.  Patented Sept. 8, 1908.

Application filed February 12, 1908. Serial No. 415,611.

*To all whom it may concern:*

Be it known that I, FERDINAND SEIM, a citizen of the United States, residing at Louisville, in the county of Jefferson and State of Kentucky, have invented new and useful Improvements in Processes of Granulating and Purifying Butter, of which the following is a specification.

This invention relates to the art of granulating and purifying butter, and some of the objects of my improvement are, to purify and granulate butter which was unskilfully made, to take batches of butter made at different times, of different colors, and of different qualities, some or all of it perhaps being old and rancid, and to produce a single batch of butter therefrom which shall be pure, sweet, odorless, of uniform color, and granulated, like that made by the most approved process, and thus render palatable and wholesome butter that heretofore would have been thrown away as useless.

In carrying out my process I prefer to use machinery such as I have illustrated in the accompanying drawings, in which—

Figure 1 is a side elevation; Fig. 2, a top plan view with the gearing removed, showing the vertical hollow shafts in section; Fig. 3, a front end view; and, Fig. 4, a sectional view of the agitator in elevation.

Similar reference characters refer to similar parts throughout the several views of the drawings.

A rectangular tank 1 is provided, open at the top, and having a vertically sliding gate or valve 2, or equivalent means, for allowing the butter suspended in the liquid to flow out into an adjacent butter worker 24. The tank 1 is preferably mounted at its rear end, by means of pivot brackets 3, on a pivot shaft 4. A stationary frame, consisting of posts 5, cross braces 6, and upper cross bars 7, is provided in which tank 1 is pivotally mounted. The forward end of the tank is provided with means for raising and lowering or tilting which may consist of a transverse shaft 8 above the tank, provided with a crank 9 to rotate it, and a vertical chain 10 at each side of the tank connected at its lower end with the bottom of the tank and at its upper end with shaft 8 so that it may be wound upon the shaft or unwound therefrom, in order to raise or lower the front end of the tank. A ratchet wheel 11 is mounted on shaft 8 and controlled by a pawl 12, in order to hold the tank in the desired position.

Driving mechanism is mounted in a stationary frame, comprising parts 13, which are preferably secured on cross bars 7. Driving mechanism is provided which may be as shown in the embodiment of my invention here illustrated. Pulleys 14, for receiving a belt, one of the pulleys being loose and the other tight, provide means for starting and stopping the agitating mechanism. Bevel gears 13 are mounted on the shaft with pulleys 14 and mesh with bevel pinions 16 on vertical hollow shafts 17 which extend downward within and near the bottom of tank 1. On shafts 17 are mounted, at their lower ends, hollow stirrers or agitators 18. These I prefer to construct of tubing closed at their ends and provided intermediate their ends with perforations 19 for the exit of air therefrom. Above agitators 18 are mounted other agitators, or beaters, 20, to rotate with shafts 17. Beaters 20 are preferably triangular in cross section, or of any form suitable to thoroughly cut up solid butter that may be placed in the tank. Ball joints or other swivel means, 21, are provided at the upper ends of shafts 17 to permit of air-tight connection between a stationary supply pipe 22 and shafts 17, in order that air from a suitable supply may be forced through shafts 17 and agitators 18.

A steam coil 23 is provided, preferably at the bottom of the tank, in order to heat the liquid in the tank by means of steam. A butter worker 24 of any approved type may be placed, as shown, in proximity with tank 1 and so positioned that when the forward end of the tank is lowered, and gate 2 raised, the butter swimming on the liquid in the tank quickly and readily flows into it, to be worked in the usual manner.

Country butter made by different individuals, with various kinds of churns, and by various processes, lacks uniformity in color, texture, and quality, even that made by the same party varies in the different batches produced. Frequently the butter is kept until it is no longer quite fresh. Sometimes, again, it is made in atmospheric and other conditions which are not altogether sanitary. Such butter is often brought to the dealer and is difficult to dispose of in its original condition. By my new process I am enabled to take this butter and render it of uniformly excellent quality. To do this, I place it in pure water or a mixture of water and milk, or in skim-milk, raise it to a temperature of from 55 to 70 degrees, according to the season and the condition of the butter when being treated. After it has reached the proper temperature it is violently agitated in order to cut up the lumps thoroughly and distribute it in the liquid. By this means all the globules are exposed to the action of the liquid and are thoroughly washed, the liquid taking up the impurities that may have been developed and confined between the globules. When it is noticed that the butter is of a viscous and ropy texture, and it is judged that it has been well washed, the mixture of liquid and butter is suddenly chilled to a temperature of from 35 to 45 degrees according to the condition of the butter due to the season or the atmospheric temperature. As soon as the chilling is begun, a strong current of pure air is introduced preferably through the stirrers 18, though the air may be introduced through a stationary coil in the bottom of the tank. The agitators 18 and 20 are rotated quite rapidly in order to thoroughly mingle the air with the liquid, and the impurities washed from the butter and such as may still adhere to the butter globules are oxidized and carried off. Through the agitating and chilling process, the butter, which previously was viscous and ropy, is separated into fine granules and is thus thoroughly mingled with the liquid. When this separation and granular formation has been thoroughly accomplished, which requires about five minutes, the agitators are stopped and the butter is found swimming on the top of the liquid in a layer of pure granules resembling a snow-drift, the entire aggregation being of a uniform color throughout. The liquid and butter are then allowed to flow out suddenly into an adjacent butter worker, where it is worked and treated in the same manner as freshly churned butter.

I am aware that butter has been treated with air, to remove impurities, but this has been done sometimes after the butter has been liquefied by melting or by disintegrating the solid butter. But I have found by experience that the purification is effectually attained and the original fresh taste of the butter preserved by the process just described. By melting the nature of the butter is changed, the butter sacks being destroyed and the globules being irretrievably agglomerated, an attempt to disintegrate the cold, solid butter is not thoroughly effectual, some of the globules escaping the purifying action. The purification by my process is effectual and enduring, producing a beautiful and palatable article.

I claim—

The process of purifying and granulating butter, consisting of putting the butter into a liquid, bringing the liquid and butter to a temperature of from 55 to 70 degrees, to render it viscous and ropy, violently agitating the liquid and butter in this condition to thoroughly disintegrate it and expose the surface of all the butter globules to the circumambient liquid, then forcing a strong current of pure cold air through the mixture to thoroughly oxidize and remove impurities, at the same time suddenly chilling the mixture to from 35 to 45 degrees while being violently agitated to bring the butter into the granular form.

FERDINAND SEIM.

Witnesses:
 MINNIE C. ROLLWAGE,
 D. B. MEDANICH.